(12) United States Patent
Kwon

(10) Patent No.: US 7,597,027 B2
(45) Date of Patent: Oct. 6, 2009

(54) ISOLATOR FOR A MOTION TRANSMITTING REMOTE CONTROL ASSEMBLY

(75) Inventor: Young Dae Kwon, 625-2, Upsung-Dong, CheonAn City, Choong-Nam (KR) 330-290

(73) Assignee: Young Dae Kwon (KR)

( * ) Notice: Subject to any disclaimer, the term of this patent is extended or adjusted under 35 U.S.C. 154(b) by 0 days.

(21) Appl. No.: 12/175,682

(22) Filed: Jul. 18, 2008

(65) Prior Publication Data

US 2009/0019964 A1  Jan. 22, 2009

Related U.S. Application Data

(60) Provisional application No. 60/950,639, filed on Jul. 19, 2007.

(51) Int. Cl.
*F16C 1/10* (2006.01)
*F16C 1/20* (2006.01)

(52) U.S. Cl. .................. 74/502.6; 74/502.4; 74/502.5; 74/500.5; 403/202; 403/220; 248/56

(58) Field of Classification Search ..... 74/502.4–502.6, 74/500.5, 501.5 R; 403/194, 195, 201, 202, 403/203, 220–228, 238, 239, 242; 248/56, 248/644, 673
See application file for complete search history.

(56) References Cited

U.S. PATENT DOCUMENTS

| | | | |
|---|---|---|---|
| 4,726,251 A * | 2/1988 | Niskanen | 74/502 |
| 5,265,495 A * | 11/1993 | Bung et al. | 74/502.6 |
| 5,383,377 A | 1/1995 | Boike | |
| 5,685,199 A * | 11/1997 | Malone | 74/502.4 |
| 5,884,531 A * | 3/1999 | Koenig | 74/502.4 |
| RE36,722 E | 6/2000 | Reasoner | |
| 6,263,756 B1 * | 7/2001 | Gabas Cebollero et al. | 74/502.4 |
| 6,282,979 B1 * | 9/2001 | Meyer | 74/502.4 |
| 6,401,565 B1 * | 6/2002 | Wang et al. | 74/502.4 |
| 6,748,820 B2 * | 6/2004 | Ruhlander | 74/502.4 |
| D495,725 S * | 9/2004 | Kwon | D15/149 |
| 7,353,728 B2 * | 4/2008 | Ruhlander et al. | 74/502 |

(Continued)

FOREIGN PATENT DOCUMENTS

EP      556064 A2 *   8/1993

(Continued)

*Primary Examiner*—Richard W L Ridley
*Assistant Examiner*—Timothy J Murphy
(74) *Attorney, Agent, or Firm*—Dickinson Wright PLLC

(57) ABSTRACT

A motion transmitting remote control assembly (20) of the type for transmitting motion in a curved path by a flexible core element (22) in a conduit (24) is secured to a support structure (76) having a U-shaped slot. A coupling body (36) surrounds the core element (22) and is surrounded by a support body (66) for attachment to the support structure (76). A flange (42) extends radially about the coupling body (36) and is disposed axially between a first and second ends (38, 40) of the coupling body (36). First and second isolators (52, 54) surround the coupling body (36) on opposite sides of the flange (42) and include first and second ribs (63, 64) projecting radially from first and second head portions (61, 62) of the isolators (52, 54). The first and second ribs (63, 64) contact an inner radial surface (122) of the support body (66) thereby spacing the first and second head portions (61, 62) from the support body (66).

12 Claims, 4 Drawing Sheets

U.S. PATENT DOCUMENTS

| | | | |
|---|---|---|---|
| 2001/0013260 A1* | 8/2001 | Cebollero | 74/501.5 R |
| 2002/0104402 A1* | 8/2002 | Ruhlander | 74/502.4 |
| 2002/0189390 A1* | 12/2002 | Mayville et al. | 74/502.6 |

FOREIGN PATENT DOCUMENTS

| | | | |
|---|---|---|---|
| JP | 01299313 A | * | 12/1989 |
| KR | 200226031 | | 3/2001 |

* cited by examiner

ISOLATOR FOR A MOTION TRANSMITTING REMOTE CONTROL ASSEMBLY

CROSS REFERENCE TO RELATED APPLICATION

This application claims the benefit of application Ser. No. 60/950,639 filed Jul. 19, 2007.

BACKGROUND OF THE INVENTION

1. Field of the Invention

The subject invention relates generally to a motion transmitting remote control assembly for transmitting motion in a curved path by a flexible motion transmitting core element.

2. Description of the Prior Art

Such motion transmitting remote control assemblies for transmitting motion in a curved path are typically used for positioning of transmission shift members in automobiles, throttle controls, hood latches, and the like. These assemblies include a flexible motion transmitting core element and a conduit extending along an axis, movably supporting the core element. The core element is adapted at one end to be attached to a member to be controlled (such as an automobile transmission), and at another end to a manual actuator (such as a transmission shift lever).

The Korean Registration No. 20-0226031 provides a connector and a swivel tube surrounding a core element and connected together by a coupling body. The coupling body is supported by a support body extending along the axis. The support body supports the assembly in a U-shaped slot in a support structure. The coupling body has a tubular shape extending between a first end and a second end, and includes a flange extending radially about the coupling body between the first and second ends. A pair of isolators include cylindrical portions surrounding the coupling body, and are disposed on opposite sides of the flange. The isolators include web portions projecting radially from outer surfaces that are axially shorter than the cylindrical portions. The isolators also include head portions projecting radially from the web portions that are axially shorter than the cylindrical portions, but axially longer than the web portions. The head portions directly contact an inner radial surface of the support body to isolate the support body from direct contact with the coupling body. Contact between the isolator and the support body will transmit vibration noise to the member to be controlled, or to the manual actuator.

SUMMARY OF THE INVENTION

The invention provides such an assembly including such an isolator having a rib projecting radially beyond the head portion and contacting the inner radial surface of the support body for spacing the first head portion radially from the inner radial surface.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
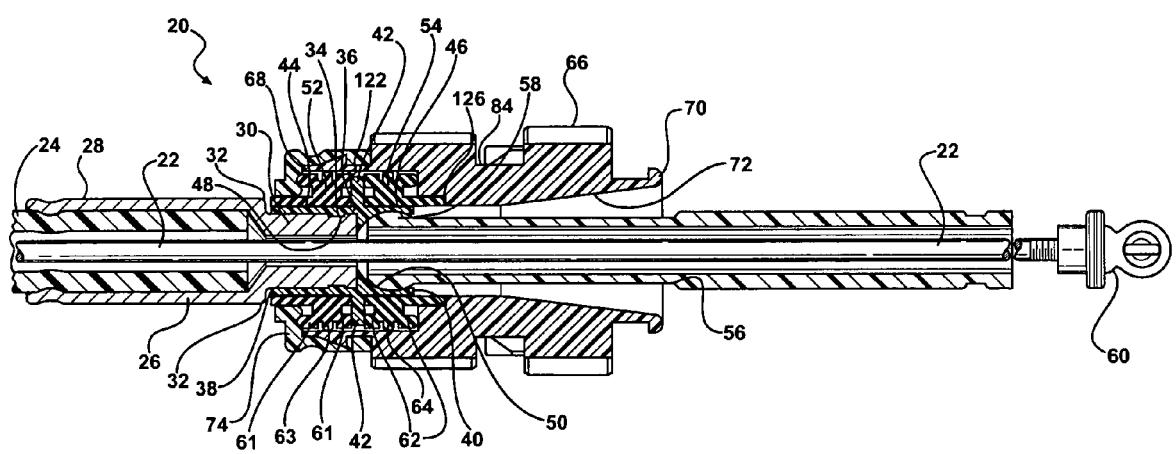
FIG. 1 is a cross section of a motion transmitting remote control assembly according to an exemplary embodiment of the present invention.
Figure 1A:
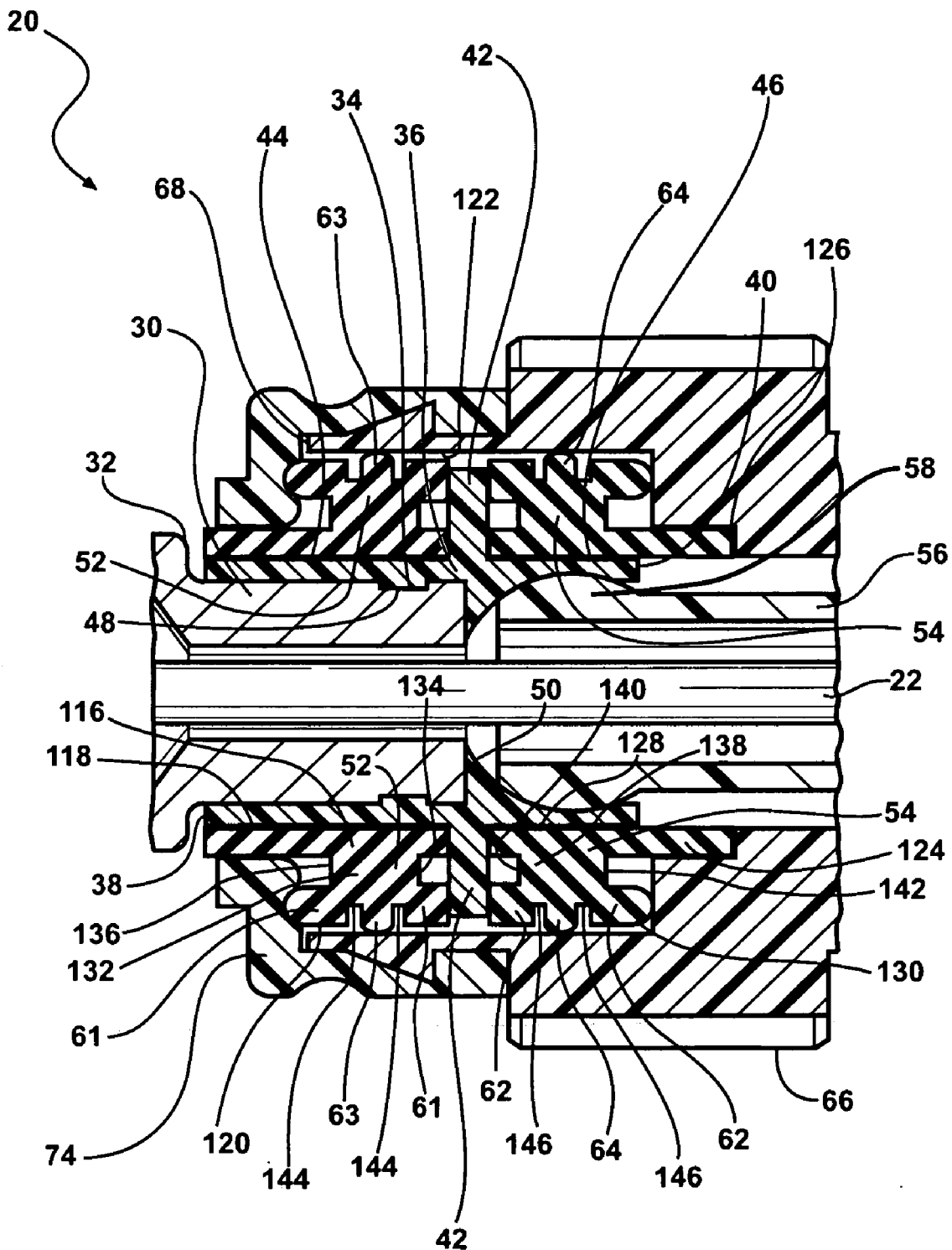
FIG. 1A is a fragmentary view of the cross section of FIG. 1.

Referring to the Figures, wherein like numerals indicate corresponding parts throughout the several views, a motion transmitting remote control assembly is generally indicated at 20. Referring to FIGS. 1 and 1A, the assembly 20 includes a flexible motion transmitting core element 22 for transmitting motion in a curved path. A conduit 24 extends along an axis and movably supports the core element 22. The conduit 24 is of the known type used in motion transmitting remote control assemblies 20 including an inner tubular member of organic polymeric material surrounded by a plurality of long lay wires disposed on a long lead and encased in an outer jacket of organic polymeric material.

A connector 26 extends along the axis and an elongated tubular portion 28 of the connector 26 surrounds the conduit 24 and is crimped thereto. A narrow end portion 30 of the connector 26 is axially shorter than the elongated tubular portion 28 and has a narrower diameter than the elongated tubular portion 28. A shoulder 32 is disposed axially between the elongated tubular portion 28 and the narrow end portion 30. An annular channel 34 extends circumferentially about the narrow end portion 30 of the connector 26.

A coupling body 36 has a tubular shape and extends along the axis between a first end 38 and a second end 40. A flange 42 extends radially about the coupling body 36 and is disposed axially between the first and second ends 38, 40. A first pocket 44 is defined on the first end 38 side of the flange 42, and a second pocket 46 is defined on the second end 40 side of the flange 42. The coupling body 36 surrounds the connector 26 between the first end 38 and the flange 42. A ridge 48 of the coupling body 36 extends radially into the annular channel 34 of the narrow end portion 30 of the connector 26 for securing the connector 26 to the coupling body 36. A spherical pocket 50 is presented within the coupling body 36 between the second end 40 and the flange 42. A first isolator 52 is disposed in the first pocket 44 of the coupling body 36 and extends axially between the flange 42 and the first end 38 of the coupling body 36. A second isolator 54 is disposed in the second pocket 46 of the coupling body 36 and extends from the flange 42 and axially beyond the second end 40 of the coupling body 36. A swivel tube 56 surrounds the core element 22 and has a spherical end 58 supported in the spherical pocket 50 for swiveling movement of the swivel tube 56 relative to the coupling body 36. The core element 22 is connected to an end fitting 60 which is connected to either a member to be controlled, or to a manual actuator.

The first isolator 52 has a first head portion 61 and the second isolator 54 has a second head portion 62. A first rib 63 projects radially from and beyond the first head portion 61, and a second rib 64 projects radially from and beyond the second head portion 62. The isolators 52, 54 contact a support body 66 along the ribs 63, 64, spacing the first and second head portions 61, 62 from an inner surface of the support body 66. The isolators 52, 54 are described in more detail below.

The support body 66 extends along the axis between a connecting end 68 and a swivel end 70 and surrounds the first and second isolators 52, 54 for isolating the connector 26 from direct contact with the support body 66. The support body 66 surrounds the connector 26 adjacent the connecting end 68, and surrounds the swivel tube 56 adjacent the swivel end 70. A frustoconical inner wall 72 extends axially into the support body 66 from the swivel end 70 to accommodate the swivel tube 56. A cap 74 is secured to the connecting end 68 of the support body 66 for axially abutting the first isolator 52.

Figure 2:
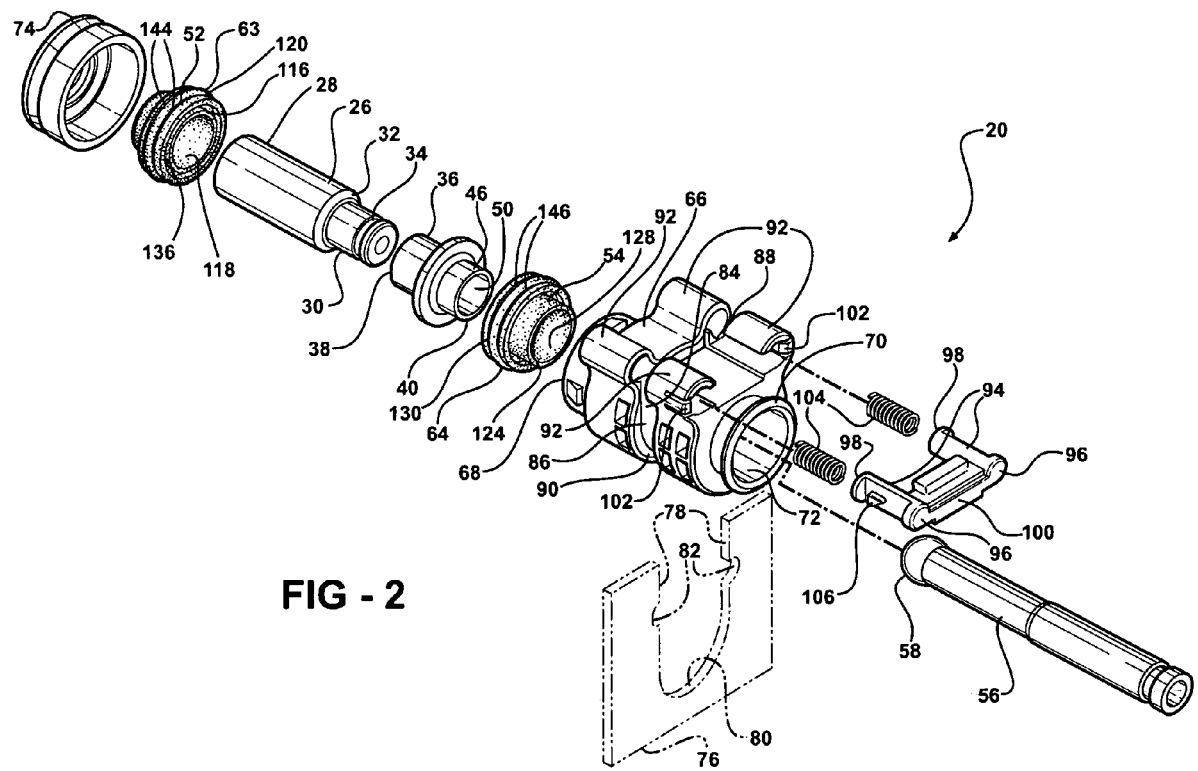
FIG. 2 is an exploded view of the motion transmitting remote control assembly according to the exemplary embodiment.

Referring to FIG. 2, the assembly 20 is to be supported in a plate-like support structure 76 having a U-shaped slot. The U-shaped slot is defined by parallel edges 78 and a bottom edge 80 extending along an arc and connecting the parallel edges 78. The assembly 20 is retained by notches 82 in the parallel edges 78.

A groove 84 is defined on the support body 66, extending in a U-shape. A first leg 86 of the groove 84 abuts one of the parallel edges 78 of the U-shaped slot, and a second leg 88 of the groove 84 abuts another of the parallel edges 78 of the slot when the support body 66 is inserted onto the support structure 76. A bottom leg 90 of the groove 84 extends along an arc between the first and second legs 86, 88 and has the same radius as the bottom edge 80 of the U-shaped slot. The bottom leg 90 of the groove 84 abuts the bottom edge 80 of the U-shaped slot when the support body 66 is inserted onto the support structure 76.

A pair of female guides 92 are defined on the support body 66 and extend axially in opposite directions from the first and second legs 86, 88 of the groove 84. A pair of slider arms 94 extend axially through the first and second legs 86, 88 of the groove 84 from retainer ends 96 to distal ends 98 and are movably supported in the female guides 92. The slider arms 94 include a cross member 100 extending transversely between the retainer ends 96 and have a grip surface disposed thereon. A pair of snap-in retainers 102 are provided to abut the retainer ends 96 of the slider arms 94 to prevent the slider arms 94 from moving out of the female guides 92. A locking position is established when the retainer ends 96 of the slider arms 94 abut the snap-in retainers 102. A pair of biasing spring members 104 are disposed within the female guides 92 and abut the distal ends 98 of the slider arms 94. The biasing spring members 104 exert a biasing force on the distal ends 98 of the slider arms 94 and urge the retainer ends 96 of the slider arms 94 against the snap-in retainers 102, thereby urging the slider arms 94 into the locking position.

A pair of locking tabs 106 project from the slider arms 94 into the first and second legs 86, 88 of the groove 84 to engage the notches 82 of the support structure 76 in the locking position. The locking tabs 106 are movable axially relative to the support body 66 in response to an axial force on the grip surface to move the slider arms 94 axially against the axial biasing force of the biasing spring members 104 to move the locking tabs 106 to an insertion position. While in the insertion position, with the locking tabs 106 moved out of the groove 84, the support body 66 can be inserted onto, or removed from, the support structure 76. With the support body 66 inserted onto the support structure 76, the axial force on the grip surface can be released. The biasing spring members 104 will then urge the retainer ends 96 of the slider arms 94 against the snap-in retainers 102, moving the locking tabs 106 into the first and second legs 86, 88 of the groove 84 to engage the notches 82 in the support structure 76. The locking tabs 106 are described in more detail and are the subject of co-pending application in U.S. patent application Ser. No. 12/175,558 which is assigned to the assignee of the present invention.

Figure 3:
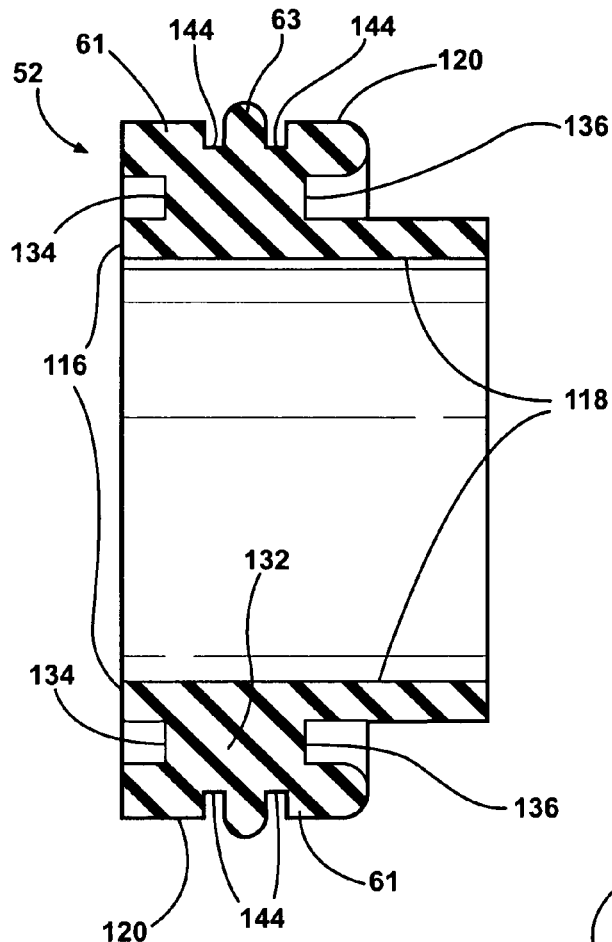
FIG. 3 is a cross section of an isolator according to the exemplary embodiment of the present invention.
Figure 4:
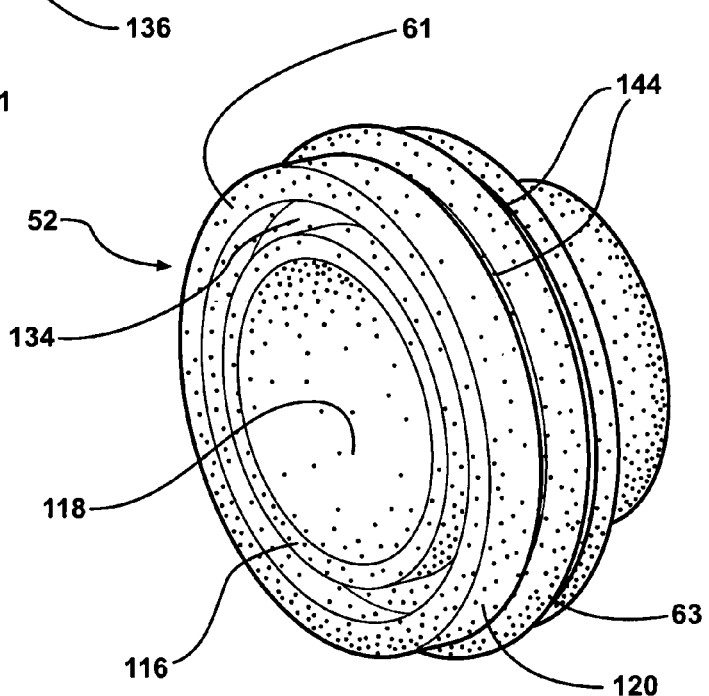
FIG. 4 is a perspective view of an isolator according to the exemplary embodiment of the present invention.

Referring to FIGS. 3 and 4, the first isolator 52 includes a first cylindrical portion 116 extending axially between the flange 42 and the first end 38 of the coupling body 36. A first inner surface 118 of the first cylindrical portion 116 surrounds the first pocket 44 of the coupling body 36. A first outer surface 120 is disposed radially outwardly from the first inner surface 118 and contacts an inner radial surface 122 of the support body 66, as will be described in more detail below.

Referring to FIG. 1A, the second isolator 54 includes a second cylindrical portion 124 extending axially from said flange 42. The second cylindrical portion 124 of the second isolator 54 extends axially beyond the second end 40 of the coupling body 36 and terminates adjacent to a countersink 126 formed within the inner radial surface 122 of the support body 66. A second inner surface 128 of the second cylindrical portion 124 surrounds the second pocket 46 of the coupling body 36. A second outer surface 130 is disposed radially outwardly from said second inner surface 128 and contacts the inner radial surface 122 of the support body 66.

The first isolator 52 includes a first web portion 132 projecting radially away from the first outer surface 120. The first web portion 132 is axially shorter than the first cylindrical portion 116. The first head portion 61 of the first isolator 52 projects radially from the first web portion 132 and is compressed axially between the flange 42 and the cap 74. The first head portion 61 is axially shorter than the first cylindrical portion 116, but axially longer than the first web portion 132. A first flange-side void 134 is defined by the first head portion 61 and extends radially between the first head portion 61 and the first cylindrical portion 116 axially adjacent to the flange 42. A first coupling-side void 136 is also defined by the first head portion 61, and extends radially between the first head portion 61 and the first cylindrical portion 116 axially adjacent to the cap 74.

The second isolator 54 includes a second web portion 138 projecting radially away from the second outer surface 130. The second web portion 138 is axially shorter than the second cylindrical portion 124. The second head portion 62 projects radially away from the second web portion 138 and is compressed axially between the flange 42 and the support body 66. The second head portion 62 is axially shorter than said second cylindrical portion 124, but axially longer than said second web portion 138. A second flange-side void 140 is defined by the second head portion 62 and extends radially between the second head portion 62 and the second cylindrical portion 124, axially adjacent to the flange 42. A second coupling-side void 142 is also defined by the second head portion 62 and extends radially between the second head portion 62 and the cylindrical portion, axially adjacent to the countersink 126 of the support body 66. The voids 134, 136, 140, 142 defined by the first and second isolators 52, 54 create a plurality of air chambers to dampen vibrations that originate from within the core element 22. Therefore, less vibration and noise will be transmitted by the assembly 20.

The first rib 63 projects radially from and beyond the first head portion 61, and contacts the inner radial surface 122 of the support body 66 thereby spacing the first head portion 61 radially from and beyond the inner radial surface 122. The second rib 64 projects radially from and beyond the second head portion 62, and contacts the inner radial surface 122 of the support body 66 thereby spacing the second head portion 62 radially from the inner radial surface 122. The radial space between the first head portion 61 and the support body 66 helps to prevent the transmission of road noise that is generated during vehicle operation. The first rib 63 is disposed axially closer to the flange 42 than the first end 38 of the coupling body 36, and the second rib 64 is disposed axially closer to the flange 42 than the countersink 126 of the support body 66. The first and second ribs 63, 64 reduce the amount of contact between the first and second isolators 52, 54 and the support body 66, and create additional air chambers. These air chambers, along with those defined by the voids 134, 136, 140, 142, reduce the amount of vibration noise transmitted by the assembly 20.

A pair of first annular recesses 144 extend radially into the first outer surface 120 of the first isolator 52 and are axially disposed on opposite sides of the first rib 63. A pair of second annular recesses 146 extend radially into the second outer surface 130 of the second isolator 54 and are axially disposed on opposite sides of the second rib 64. The first and second pairs of annular recesses 144, 146 also provide air chambers, further aiding the damping effect of the air chambers created by the first and second ribs 63, 64 and those defined by the voids 134, 136, 140, 142 of the first and second isolators 52, 54.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A motion transmitting remote control assembly (20) to be supported in a U-shaped slot in a support structure (76) defined by parallel edges (78) and a bottom edge (80) connecting the parallel edges (78) with said assembly (20) retained therein by notches (82) in the parallel edges (78), said assembly (20) comprising;
    a flexible motion transmitting core element (22),
    a conduit (24) extending along an axis and movably supporting said core element (22),
    a coupling body (36) extending along said axis between a first end (38) and a second end (40) and surrounding said core element (22) and including a flange (42) extending radially about said coupling body (36) and axially between said first and second ends (38, 40) defining a first pocket (44) on the first end (38) side of said flange (42),
    a first isolator (52) including a first cylindrical portion (116) extending axially between said flange (42) and said first end (38) of said coupling body (36) and having a first inner surface (118) surrounding said first pocket (44) of said coupling body (36) and a first outer surface (120) disposed radially outwardly from said first inner surface (118),
    a support body (66) extending along said axis and surrounding said first isolator (52) and having an inner radial surface (122) for contacting said first isolator (52) for isolating said coupling body (36) from direct contact with said support body (66),
    said first isolator (52) including a first web portion (132) projecting radially from said first outer surface (120) and extending axially shorter than said first cylindrical portion (116),
    said first isolator (52) including a first head portion (61) projecting radially from said first web portion (132) extending axially shorter than said first cylindrical portion (116) and extending axially longer than said first web portion (132), and characterized by said first isolator (52) including a first rib (63) projecting radially beyond said first head portion (61) and contacting said inner radial surface (122) of said support body (66) for spacing said first head portion (61) radially from said inner radial surface (122).

2. A motion transmitting remote control assembly (20) as set forth in claim 1 wherein said support body (66) extends along said axis between a connecting end (68) and a swivel end (70) and said assembly (20) includes a cap (74) secured to said connecting end (68) of said support body (66) for radially engaging said first outer surface (120) of said first isolator (52) axially adjacent said first end (38) of said coupling body (36) and for compressing axially said first head portion (61) between said flange (42) and said cap (74).

3. A motion transmitting remote control assembly (20) as set forth in claim 2 wherein said first isolator (52) defines a first flange-side void (134) extending radially between said first head portion (61) and said first cylindrical portion (116) and disposed axially adjacent to said flange (42) and said first isolator (52) defines a first coupling-side void (136) extending radially between said first head portion (61) and said first cylindrical portion (116) and disposed axially adjacent to said cap (74).

4. A motion transmitting remote control assembly (20) as set forth in claim 2 wherein said first rib (63) is disposed axially closer to said flange (42) than said first end (38) of said coupling body (36).

5. A motion transmitting remote control assembly (20) as set forth in claim 2 wherein said first isolator (52) includes a pair of first annular recesses (144) extending radially into said first outer surface (120) and axially disposed on opposite sides of said first rib (63).

6. A motion transmitting remote control assembly (20) as set forth in claim 2 including;
    said coupling body (36) defining a second pocket (46) on the second end (40) side of said flange (42),
    a second isolator (54) including a second cylindrical portion (124) extending axially from said flange (42) and axially beyond said second end (40) of said coupling body (36) and having a second inner surface (128) surrounding said second pocket (46) of said coupling body (36) and a second outer surface (130) disposed radially outwardly from said second inner surface (128),
    said second isolator (54) including a second web portion (138) projecting radially from said second outer surface (130) and extending axially shorter than said second cylindrical portion (124),
    said second isolator (54) including a second head portion (62) projecting radially from said second web portion (138) extending axially shorter than said second cylindrical portion (124) and extending axially longer than said second web portion (138) and compressed axially between said flange (42) and said support body (66), and
    said second isolator including a second rib (64) projecting radially beyond said second head portion (62) and contacting said inner radial surface (122) of said support body (66) for spacing said second head portion (62) radially from said inner radial surface (122).

7. A motion transmitting remote control assembly (20) as set forth in claim 6 wherein said support body (66) defines a countersink (126) axially between said connecting end (68) and said swivel end (70) for receiving said second cylindrical portion (124) of said second isolator (54).

8. A motion transmitting remote control assembly (20) as set forth in claim 7 wherein said second isolator (54) defines a second flange-side void (140) extending radially between said second head portion (62) and said second cylindrical portion (124) and axially adjacent to said flange (42) said second isolator (54) defines a second coupling-side void (142) extending radially between said second head portion (62) and said cylindrical portion and axially adjacent to said countersink (126) of said support body (66).

9. A motion transmitting remote control assembly (20) as set forth in claim 7 wherein said second rib (64) is disposed axially closer to said flange (42) than said countersink (126) of said support body (66).

10. A motion transmitting remote control assembly (20) as set forth in claim 7 wherein said second isolator (54) includes a pair of second annular recesses (146) extending radially into said second outer surface (130) and axially disposed on opposite sides of said second rib (64).

11. A motion transmitting remote control assembly (20) as set forth in claim 7 including;
- a connector (26) extending along said axis having an elongated tubular portion (28) surrounding said conduit (24) and crimped thereto,
- said coupling body (36) surrounding said connector (26) between said first end (38) and said flange (42),
- said coupling body (36) presenting a spherical pocket (50) between said second end (40) and said flange (42),
- a swivel tube (56) surrounding said core element (22) and having a spherical end (58) supported in said spherical pocket (50) for swiveling movement of said swivel tube (56) relative to said coupling body (36),
- said support body (66) defining a groove (84) extending in a U-shape for abutting the edges (78, 80) of the U-shaped slot,
- said support body (66) defining a pair of female guides (92) extending axially in opposite directions from said groove (84),
- a pair of slider arms (94) extending axially through said groove (84) from retainer ends (96) to distal ends (98) and movably supported in said female guides (92),
- said support body (66) including a pair of snap-in retainers (102) for abutting said retainer ends (96) of said slider arms (94) for preventing said slider arms (94) from moving out of said female guides (92) to establish a locking position,
- a pair of biasing spring members (104) disposed within said female guides (92) and abutting said distal ends (98) of said slider arms (94) for exerting a biasing force on said distal ends (98) of said slider arms (94) to urge said slider arms (94) into said locking position, and
- said slider arms (94) including a pair of locking tabs (106) projecting into said groove (84) for engaging the notches (82) of the support structure (76) in said locking position.

12. A motion transmitting remote control assembly (20) to be supported in a U- shaped slot in a support structure (76) defined by parallel edges (78) and a bottom edge (80) extending along an arc having a radius and connecting the parallel edges (78) with said assembly (20) retained therein by notches (82) in the parallel edges (78), said assembly (20) comprising;
- a flexible motion transmitting core element (22),
- a conduit (24) extending along an axis and movably supporting said core element (22),
- a connector (26) extending along said axis having an elongated tubular portion (28) surrounding said conduit (24) and crimped thereto and having a narrow end portion (30) axially shorter than said elongated tubular portion (28) and having a narrower diameter than said elongated tubular portion (28) and having a shoulder (32) disposed axially between said elongated tubular portion (28) and said narrow end portion (30) and defining an annular channel (34) extending circumferentially about said narrow end portion (30),
- a coupling body (36) having a tubular shape extending along said axis between a first end (38) and a second end (40) and a flange (42) extending radially about said coupling body (36) axially between said first and second ends (38, 40) defining a first pocket (44) on the first end (38) side of said flange (42) and a second pocket (46) on the second end (40) side of said flange (42),
- said coupling body (36) surrounding said connector (26) between said first end (38) and said flange (42) and presenting a ridge (48) extending radially into said annular channel (34) of said narrow end portion (30) of said connector (26) for securing said connector (26) to said coupling body (36),
- said coupling body (36) presenting a spherical pocket (50) between said second end (40) and said flange (42),
- a swivel tube (56) surrounding said core element (22) and having a spherical end (58) supported in said spherical pocket (50) for swiveling movement of said swivel tube (56) relative to said coupling body (36),
- a first isolator (52) including a first cylindrical portion (116) extending axially between said flange (42) and said first end (38) of said coupling body (36) and having a first inner surface (118) surrounding said first pocket (44) of said coupling body (36) and a first outer surface (120) disposed radially outwardly from said first inner surface (118),
- a second isolator (54) including a second cylindrical portion (124) extending axially from said flange (42) and axially beyond said second end (40) of said coupling body (36) and having a second inner surface (128) surrounding said second pocket (46) of said coupling body (36) and a second outer surface (130) disposed radially outwardly from said second inner surface (128),
- a support body (66) extending along said axis between a connecting end (68) and a swivel end (70) and surrounding said first and second isolators (52, 54) and having an inner radial surface (122) for contacting said first and second isolators (52, 54) for isolating said coupling body (36) from direct contact with said support body (66),
- said support body (66) defining a countersink (126) axially between said connecting end (68) and said swivel end (70) for receiving said second cylindrical portion (124) of said second isolator (54),
- said support body (66) surrounding said connector (26) adjacent said connecting end (68) and surrounding said swivel tube (56) adjacent said swivel end (70) and including a frustoconical inner wall (72) extending axially into said support body (66) from said swivel end (70),
- a cap (74) secured to said connecting end (68) of said support body (66) for radially engaging said first outer surface (120) of said first isolator (52) axially adjacent said first end (38) of said coupling body (36),
- said support body (66) defining a groove (84) extending in a U-shape having a first leg (86) for abutting one of the parallel edges (78) of the U-shaped slot and a second leg (88) for abutting another of the parallel edges (78) of the slot and a bottom leg (90) extending along an arc between said first and second legs (86, 88) having the same radius as the bottom edge (80) of the U-shaped slot for abutting the bottom edge (80) of the U-shaped slot, said support body (66) defining a pair of female guides (92) extending axially in opposite directions from said first and second legs (86, 88) of said groove (84), a pair of slider arms (94) extending axially through said first and second legs (86, 88) of said groove (84) from retainer ends (96) to distal ends (98) and movably supported in said female guides (92), said slider arms (94) including a cross member (100) extending transversely between said retainer ends (96) and having a grip surface disposed thereon, said support body (66) including a pair of snap-in retainers (102) for abutting said retainer ends (96) of said slider arms (94) for preventing said slider arms (94) from moving out of said female guides (92) to establish a locking position, a pair of biasing spring members (104) disposed within said female guides (92) and abutting said distal ends (98) of said slider arms (94) for exerting a biasing force on said distal ends (98) of said slider arms (94) to urge said slider arms (94) into said locking position, said slider arms (94) including a pair of locking tabs (106) projecting into said first and second legs (86, 88) of said groove (84) for engaging the notches (82) of the support structure (76) in said locking position and for moving axially relative to said support body (66) in response to an axial force on said grip surface to move said slider arms (94) axially against the axial biasing force of said biasing spring members (104) to move said locking tabs (106) to an insertion position, said first isolator (52) including a first web portion (132) projecting radially from said first outer surface (120) and extending axially shorter than said first cylindrical portion (116), said first isolator (52) including a first head portion (61) projecting radially from said first web portion (132) extending axially shorter than said first cylindrical portion (116) and extending axially longer than said first web portion (132) and compressed axially between said flange (42) and said cap (74), said first isolator (52) defining a first flange-side void (134) extending radially between said first head portion (61) and said first cylindrical portion (116) and axially adjacent to said flange (42), said first isolator (52) defining a first coupling-side void (136) extending radially between said first head portion (61) and said first cylindrical portion (116) and axially adjacent to said cap (74), said second isolator (54) including a second web portion (138) projecting radially from said second outer surface (130) and extending axially shorter than said second cylindrical portion (124), said second isolator (54) including a second head portion (62) projecting radially from said second web portion (138) extending axially shorter than said second cylindrical portion (124) and extending axially longer than said second web portion (138) and compressed axially between said flange (42) and said support body (66), said second isolator (54) defining a second flange-side void (140) extending radially between said second head portion (62) and said second cylindrical portion (124) and axially adjacent to said flange (42), said second isolator (54) defining a second coupling-side void (142) extending radially between said second head portion (62) and said cylindrical portion and axially adjacent to said countersink (126) of said support body (66), characterized by said first isolator (52) including a first rib (63) projecting radially beyond said first head portion (61) and contacting said inner radial surface (122) of said support body (66) for spacing said first head portion (61) radially from said inner radial surface (122), said first rib (63) disposed axially closer to said flange (42) than said first end (38) of said coupling body (36), said second isolator including a second rib (64) projecting radially beyond said second head portion (62) and contacting said inner radial surface (122) of said support body (66) for spacing said second head portion (62) radially from said inner radial surface (122), said second rib (64) disposed axially closer to said flange (42) than said countersink (126) of said support body (66), said first isolator (52) including a pair of first annular recesses (144) extending radially into said first outer surface (120) and axially disposed on opposite sides of said first rib (63), and said second isolator (54) including a pair of second annular recesses (146) extending radially into said second outer surface (130) and axially disposed on opposite sides of said second rib (64).

* * * * *